UNITED STATES PATENT OFFICE.

CARL KOLBE, OF RADEBEUL, SAXONY, GERMANY, ASSIGNOR TO DR. F. VON HEYDEN, NACHFOLGER, OF SAME PLACE.

MANUFACTURE OF SALICYLIC-ACID ESTERS.

SPECIFICATION forming part of Letters Patent No. 383,306, dated May 22, 1888.

Application filed December 29, 1887. Serial No. 259,341. (No specimens.) Patented in Belgium July 22, 1887, No. 78,316; in France July 22, 1887, No. 176,796; in England July 22, 1887, No. 10,260, and in Italy September 30, 1887, XLIV, 346, and XXI, 22,073.

*To all whom it may concern:*

Be it known that I, CARL KOLBE, doctor of philosophy, a subject of the King of Saxony, residing at Radebeul, Saxony, Germany, have invented certain new and useful Improvements in the Manufacture of Salicylic-Acid Esters, (for which I have obtained patents in Belgium, dated July 22, 1887, No. 78,316; France, dated July 22, 1887, No. 176,796; Italy, dated September 30, 1887, No. 44, 346 and 21, 22,073, and Great Britain, dated July 22, 1887, No. 10,260;) and I do hereby declare the following to be a full, clear, and exact description of the invention, such as will enable others skilled in the art to which it appertains to make and use the same.

This invention relates to an improved process of manufacturing salicylic-acid esters.

In Letters Patent No. 350,012, granted to Dr. F. von Heyden, Nachfolger, as assignee of Nencki and Seiffert, September 28, 1886, a compound ether is described which is known as "salol," and which is produced by the action of oxychloride of phosphorus upon a mixture of salicylic acid and a phenol. I have found that by substituting trichloride of phosphorus for oxychloride of phosphorus in the manufacture of salol certain advantages are obtained, as will be understood from the following description.

In carrying out my invention I prepare a mixture of one molecule of salicylic acid and one molecule of phenol, and after having melted the same I add thereto a solution of trichloride of phosphorus, ($PCl_3$.) By the action of this trichloride a reaction takes place, and the salicylic acid is converted into salol $\left(C_6H_4{}^{OH}_{COOC_6H_5}\right)$ mixed with a small quantity of triphenyl-phosphite—an oily substance which, being very easily soluble in alcohol, can be readily removed. This reaction is illustrated by the following formula:

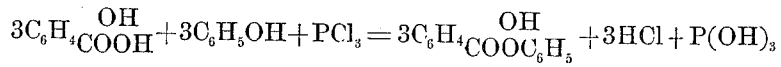

$$3C_6H_4{}^{OH}_{COOH} + 3C_6H_5OH + PCl_3 = 3C_6H_4{}^{OH}_{COOC_6H_5} + 3HCl + P(OH)_3$$

In place of free salicylic acid I can employ the salts of salicylic acid, such as salicylate of soda or potash; but if in place of phenol salts of phenol are used the result is a very impure product.

In this process I am enabled to add to the mixture of salicylic acid and phenol a solvent, and for this purpose hydrocarbons—such as benzole, toluol, or heavy petroleum—can be used with a good result. After the reaction produced by the trichloride of phosphorus has been completed the solvent is removed by distillation, and the salol which remains is then washed in pure water, or in a solution of carbonate of soda, and, if desired, it can be recrystallized by means of alcohol.

In carrying out my process different phenols may be used—such, for instance, as resorcin, the two naphthols, and dioxynaphthaline.

I do not claim anything described in Patent No. 350,012.

What I claim as new, and desire to secure by Letters Patent, is—

1. The within-described process of producing salol, which consists in mixing together equal molecules of salicylic acid with equal molecules of a phenol, melting this mixture, and then adding thereto a solution of trichloride of phosphorus, substantially as set forth.

2. The within-described process of producing salol, which consists in mixing together equal molecules of salicylic acid with equal molecules of a phenol, dissolving the mixture in a suitable solvent, such as benzole, exposing the solution to the action of trichloride of phosphorus, and after the reaction has taken place removing the solvent, and finally washing the remaining product, substantially as set forth.

In testimony whereof I affix my signature in presence of two witnesses.

CARL KOLBE.

Witnesses:
PAUL DRUCKMÜLLER,
G. BARTHOLAMAN.